United States Patent [19]

Wessling

[11] 4,297,281
[45] Oct. 27, 1981

[54] PROCESS FOR HALOGENATING COPPER PHTHALOCYANINE

[75] Inventor: Diether Wessling, Cologne, Fed. Rep. of Germany

[73] Assignee: Bayer Aktiengesellschaft, Leverkusen, Fed. Rep. of Germany

[21] Appl. No.: 108,935

[22] Filed: Dec. 31, 1979

[30] Foreign Application Priority Data

Jan. 18, 1979 [DE] Fed. Rep. of Germany ....... 2901859

[51] Int. Cl.³ .............................................. C09B 47/04
[52] U.S. Cl. .................................................... 260/314.5
[58] Field of Search ..................................... 260/314.5

[56] References Cited

U.S. PATENT DOCUMENTS 4,020,088  4/1977  Wessling ........................... 260/314.5
4,051,146  9/1977  Wessling ........................... 260/314.5
4,077,974  3/1978  Wessling ........................... 260/314.5

FOREIGN PATENT DOCUMENTS 2449133  4/1976  Fed. Rep. of Germany ... 260/314.5
 815088  4/1937  France .............................. 260/314.5
1352337  2/1962  France .............................. 260/314.5
 461268  2/1937  United Kingdom ............. 260/314.5
2010305  6/1979  United Kingdom ............. 260/314.5

Primary Examiner—John D. Randolph
Attorney, Agent, or Firm—Sprung, Felfe, Horn, Lynch & Kramer

[57] ABSTRACT

A process for halogenating copper phthalocyanine to a halogen content of about 14 to about 15.5 halogen atoms per CuPc molecule, in an aluminium chloride/-sulphuryl chloride mixture which contains 8 to 25% by weight, relative to the amount of $AlCl_3$, of an anhydrous alkali metal halide, characterized in that the $AlCl_3/SO_2Cl_2$ mixture contains 70 to 150% by weight, relative to the amount of $AlCl_3$, of sulphuryl chloride and the halogenation is carried out under an excess pressure of 1 to 20 bars.

2 Claims, No Drawings

PROCESS FOR HALOGENATING COPPER PHTHALOCYANINE

It is known that by virtual perhalogenation of copper phthalocyanine, it is possible to obtain green to yellow-green halogen derivatives with fastness properties which are comparable with those of the blue parent substance.

Complete replacement of the 16 hydrogen atoms is of little significance industrially, because after introducing about 15.5 halogen atoms, further replacement becomes very difficult and proceeds with partial destruction of the molecule.

"Industrial perhalogenation", which is under discussion in the following text, thus comprises the introduction of at most 14 to 15.5 halogen atoms per CuPc molecule.

Inorganic compounds are mentioned predominantly in the literature as the halogenating medium, and of these compounds, Friedel-Crafts catalysts, such as, for example, the halides of aluminium, iron, zinc and antimony, are particularly suitable. Of these salts, the halides of aluminium, in particular its chlorides, have achieved the most importance industrially.

Fluxes are usually added to the aluminium chloride to lower the melting point. These fluxes can be divided into 2 groups:
1. alkali metal halides
2. sulphur compounds which contain oxygen and/or halogen.

Halogens which are of particular industrial interest are chlorine and bromine, which are employed in the halogenation reaction in the form of, for example, the sulphur compounds mentioned under 2), but preferably in elementary form.

A halogenation process which can be carried out simply and reliably on an industrial scale and which also gives crude pigments which are in a particularly favourable form from the point of view of subsequent finishing and can very easily be converted into coloristically outstanding pigments by customary after-treatment processes is described in German Auslegeschrift No. 2,449,133.

In this process, CuPc is "perchlorinated" or subjected to mixed "perbromination/perchlorination" in an $AlCl_3/NaCl/SO_2Cl_2$ melt at 90° to 150° C. by passing elementary chlorine and/or bromine into the melt.

It has now been found that the "perhalogenation" of copper phthalocyanine can be carried out particularly advantageously under pressure.

The present invention accordingly relates to a process for halogenating copper phthalocyanine to a halogen content of about 14 to about 15.5 halogen atoms per molecule of CuPc in an aluminium chloride/sulphuryl chloride mixture which contains 8 to 25% by weight, relative to the amount of $AlCl_3$, of an anhydrous alkali metal halide, characterised in that the $AlCl_3/SO_2Cl_2$ mixture contains 70 to 150% by weight, relative to the amount of $AlCl_3$, of sulphuryl chloride and the halogenation is carried out under an excess pressure of 1 to 20 bars.

The process according to the invention is preferably carried out in an excess pressure range of 1 to 10 bars, and very particularly preferably under 3 to 6 bars.

The process is used preferably to chlorinate and/or brominate CuPc.

The halogenation is preferably carried out in an $AlCl_3/SO_2Cl_2$/alkali metal halide mixture which contains, relative to the amount of $AlCl_3$, 80 to 130% by weight of sulphuryl chloride and 10 to 15% by weight of sodium chloride. Instead of NaCl, it is also possible, for example, to use KCl, NaBr and KBr as the alkali metal halide.

The "perhalogenation" is appropriately carried out at temperatures of 90° to 150° C.; it can consist of pure chlorination by passing in elementary chlorine, or of mixed chlorination and bromination, in which case bromine is also added and the halogens are each metered in under pressure.

Surprisingly, the rate of reaction and the percentage chemical utilisation of the available halogenating agent are significantly increased by carrying out the halogenation under pressure, and considerable economic and ecological advantages thus result.

These effects could not be foreseen, since not only the halogenating agents (chlorine and/or bromine) but also the off-gases from the reaction (HCl and/or HBr) are affected by increasing the pressure in the gas space over the chlorination melt and a higher affinity of the off-gases for the polar $AlCl_3$ melt would have been expected, as a result of their relatively high polarity; the melt should thus rather, have lost some of its effectiveness as an activating medium for the halogens.

Another surprising effect is the fact that when the halogenating melt, consisting of $AlCl_3$, $SO_2Cl_2$, CuPc, $Br_2$ if appropriate, and an alkali mixture is heated under pressure to the final temperature of the "perhalogenation", namely above 90° C., virtually only gaseous substances which cannot be condensed with water-cooled condensers escape, so that condensers which need to be of a special design, for safety reasons, can be dispensed with.

EXAMPLE 1

40.0 kg of anhydrous aluminium chloride, 5.0 kg of anhydrous sodium chloride and 43.0 kg of sulphuryl chloride are initially introduced into a reaction vessel and the suspension is warmed to 50° to 65° C. 16.0 kg of copper phthalocyanine are introduced at this temperature in the course of 3 to 4 hours. The reaction vessel is then closed and the mixture is heated to 100° to 110° C. in the course of 3 to 4 hours.

When the excess pressure exceeds 4.5 bars, the reaction vessel is let down to an extent such that an excess pressure of 4 to 4.5 bars is established.

When the temperature has reached 100° to 110° C., introduction of 18.0 to 20.0 kg of chlorine under pressure at a rate of 3.0 to 5.0 kg/hour is started, the halogenation melt being simultaneously heated further to 140° to 150° C. The excess pressure in the reaction vessel is kept at 4 to 4.5 bars by continuous letting down.

The melt is discharged onto 200 to 300 kg of water. The mixture is heated to 90° to 100° C. for 1 to 2 hours whilst passing air through and the solid is then filtered off hot, washed with hot water until free from salts and dried at 80° to 120° C.

The crude pigment thus obtained has a chlorine content of 48.0 to 49.5% and is directly suitable for incorporation into many pigment preparations without the otherwise customary procedures of making into a paste or swelling with sulphuric acid or heat treatment in the presence of organic solvents.

If an additionally improved pigment is required, the crude pigment, as the moist filter cake or as the dried material, can be subjected to an after-treatment by heating at 80° to 200° C. with toluene or other organic solvents, alkalis and emulsifiers being added if appropriate.

EXAMPLE 2

40.0 kg of anhydrous aluminium chloride, 5.0 kg of anhydrous sodium chloride, 50.0 kg of sulphuryl chloride and 17.3 kg of bromine are initially introduced into a reaction vessel and the mixture is warmed to 35° to 45° C.

12.0 kg of copper phthalocyanine are introduced at this temperature in the course of 3 hours.

The kettle is then closed so that it is pressure-tight and the melt is heated to 120° to 130° C. in the course of 8 to 10 hours. When the internal pressure exceeds 4.0 bars, the kettle is let down to the extent that an excess pressure of 3.5 to 4.0 bars is established.

Introduction of 2.0 to 6.0 kg of chlorine under pressure is started from 120° C.

Working up of the melt and further use of the crude pigment are analogous to example 1.

The pigment contains 39 to 42% of bromine and 18 to 21% of chlorine and is yellowish-tinged green.

If the process is carried out without the addition of chlorine, a pigment with a higher bromine content and a lower chlorine content is obtained.

I claim:

1. A process for halogenating copper phthalocyanine to a halogen content of about 14 to about 15.5 halogen atoms per CuPc molecule, in an aluminium chloride/sulphuryl chloride mixture which contains 8 to 25% by weight, relative to the amount of $AlCl_3$, of an anhydrous alkali metal halide, characterised in that the $AlCl_3/SO_2Cl_2$ mixture contains 70 to 150% by weight, relative to the amount of $AlCl_3$, of sulphuryl chloride and the halogenation is carried out under an excess pressure of 1 to 20 bars.

2. A process according to claim 1 wherein the copper phthalocyanine is halogenated under said excess pressure 1 to 20 bars and after the application of such pressure the resultant reaction mixture is discharged into water.

* * * * *